May 15, 1934.  L. GOLDHAMMER ET AL  1,959,268
APPARATUS FOR TAKING CINEMATOGRAPHIC PICTURES
Filed Nov. 5, 1931   2 Sheets-Sheet 1
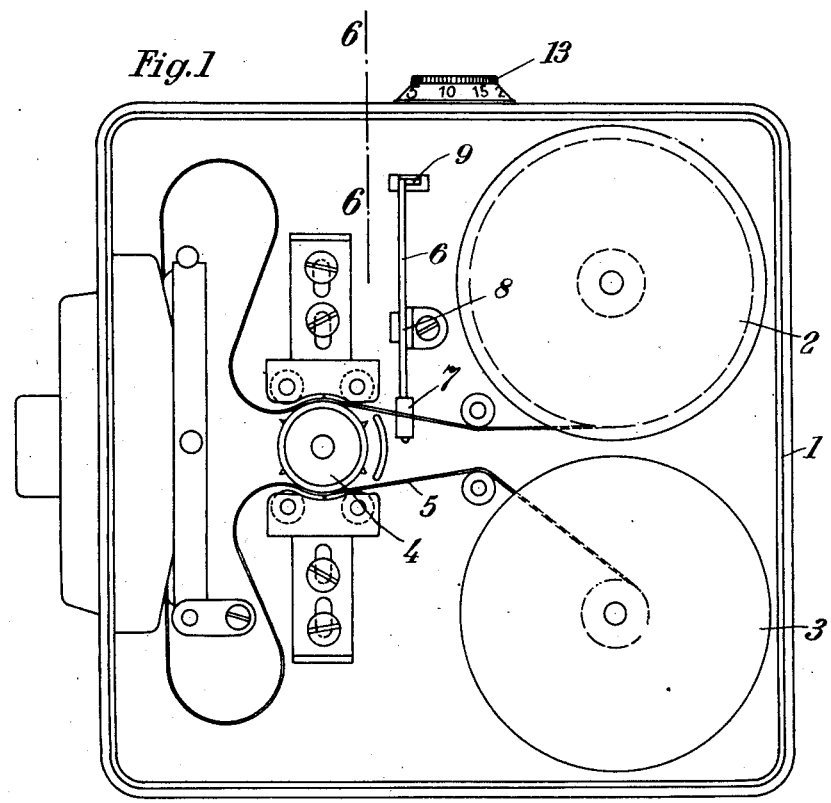
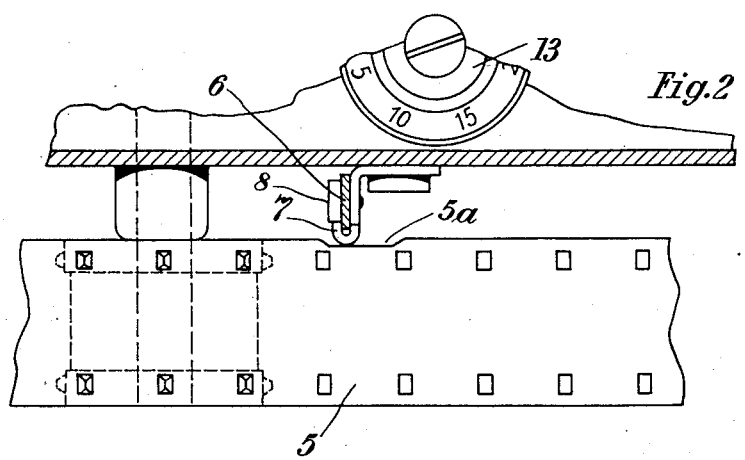
Inventors:
Leo Goldhammer,
Wilhelm Baumgärtner,
By Attorney
Philip S. Hopkins.

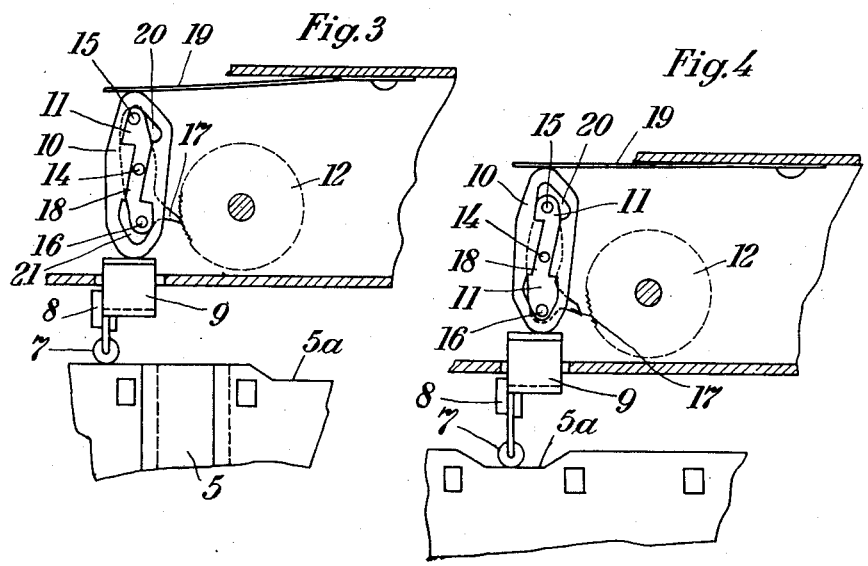
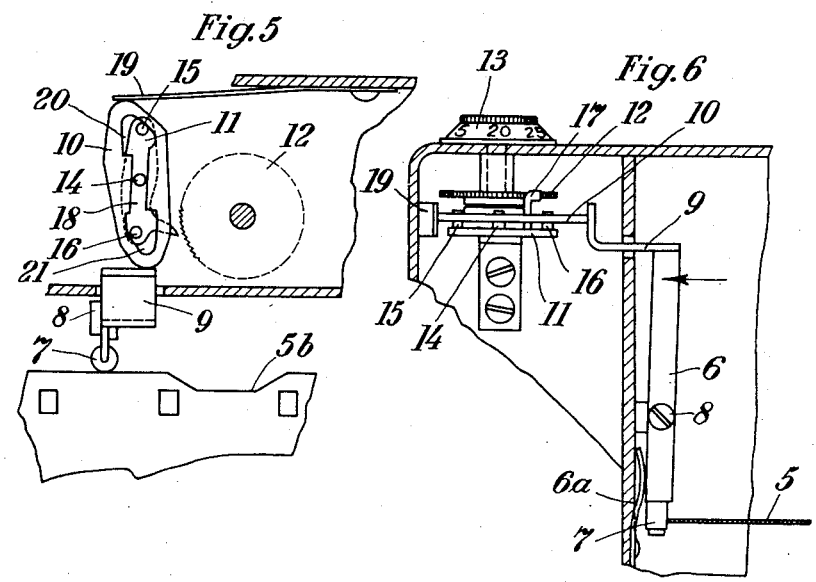

Patented May 15, 1934

1,959,268

UNITED STATES PATENT OFFICE 1,959,268

APPARATUS FOR TAKING CINEMATOGRAPHIC PICTURES

Leo Goldhammer, Munich, and Wilhelm Baumgärtner, Brunswick, Germany, assignors to Agfa Ansco Corporation, Binghamton, N. Y., a corporation of New York Application November 5, 1931, Serial No. 573,236
In Germany November 6, 1930

4 Claims. (Cl. 88—16)

Our present invention relates to a device for measuring the actual length of the film exposed in a cinematographic apparatus.

One of its objects is to provide such a measuring device which is set in action only if the photographic film band is under exposure and which is stopped while the leading ends of the film band, for instance, the protective paper strips are wound up by the film receiving spool. Further objects will be seen from the detailed specification following hereafter, reference being made to the accompanying drawings in which:

Fig. 1 shows the side view of a motion picture apparatus with the side wall removed, Fig. 2 represents the way of controlling the film meter by means of the film band the parts being shown on an enlarged scale, Fig. 3, 4 and 5 represent various positions of the controlling devices, Fig. 6 is a section on the line 6—6 of Fig. 1, representing a side view of the controlling device.

In apparatus for taking cinematographic pictures it is known to announce by an audible or visible signal the start of the driving mechanism or that it will start running off. In such apparatus there are furthermore used counting discs which indicate in meters the length of the unexposed or exposed film or which indicate the tension of the spring mechanism in meters of film length. If film spools which are not in film boxes are inserted in the apparatus, both film ends are provided with a protective paper strip, which prevents light from penetrating into the interior of the spool. In apparatus of this kind it is an inevitable disadvantage that the film meter also registers the length of the protective paper strip, so that neither the beginning nor the end of the actual exposure can be recognized.

We have found, that the registration on the film meter of the protective paper strip can be avoided, for instance, by providing a visible signal which indicates the beginning and the end of the passage of the sensitized film behind the picture gate.

For this purpose the film band itself controls a device releasing a visible signal. The control can be achieved in different manners. At the place where the paper strip and the film are united there is provided, for instance, a notch which, by mechanical means starts the film meter or stops it. If the cinematographic apparatus comprises a counting meter which is operated by the spring mechanism, the film band may, moreover, release a visible signal which announces to the operator the passage of the negative film material in the picture gate. This signal, too, may be released in a mechanical or electrical way.

We will now give a full description of one form of construction of our invention reference being made to the accompanying drawings.

In the casing 1 of the cinematographic apparatus there are mounted the delivery (supply) spool 2 and the collecting (receiving, take-up) spool 3. The film band 5 is guided through the apparatus in known manner over a feed drum 4 which may draw the film from the upper spool and feed it simultaneously to the lower one as shown in Fig. 1. In the way of the film from the delivery spool 2 to the feed drum 4, there is preferably arranged a lever 6 which by a roller 7, provided at its lower end, laterally engages the edge of the film. By a leaf-spring 6a the roller 7 is permanently kept in contact with the film 5. The lever 6 is movable about the pivot 8. The end 9 of the lever 6 which is bent in an angular form is connected with the elements by which the film meter 13 is controlled. These elements are a controlling member 10 and a brake lever 11 which co-operates with a toothed disc 12 fastened on the meter shaft. The film meter 13 is actuated by the film moving mechanism to which it is connected by a frictional coupling. The brake lever 11, movable round the pivot 14, is a double armed lever each arm being provided with a controlling pin 15 and 16. The catch 17 of the brake lever 11 is adapted to engage the toothed disc 12. The element 10 is provided with a slot 18 by means of the pivot 14 mounted on the brake lever 11 which the element 10 can glide along. By the spring 19 the element 10 is permanently pressed against the bent end 9 of the lever 6. Moreover, the element 10 has apertures 20 and 21 in which the pins 15 and 16 of the brake lever glide.

The mode of operation of the device is as follows:

At the place where the protective paper strip and the sensitized film are connected, or near this place, the film is provided with a notch 5a. While passing from the delivery spool 2 to the collecting spool 3 the film band is permanently in contact with the roller 7 of the lever 6 which is pressed against it by the leaf-spring 6a which is a little stronger than the spring 19. While the protective paper strip is unwound, the position of the controlling member 10 and of the brake lever 11 is as indicated in Fig. 3, and the catch 17 engages the toothed disc 12 so that the film meter is stopped. The length of the protective paper strip is consequently not indicated by the meter. However, when the first notch 5a, which is provided at the beginning of the sensitized film, that is to say at the place where the film is connected with the protective paper strip, comes into engagement with the roller 7, the lever 6 is moved away in the direction indicated by the arrow (Fig. 6) and the controlling member 10 is displaced, as indicated in Fig. 4, by the bent end 9 of that lever 6. By this movement of the controlling member 10 the pin 16 of the brake lever 11 which is in contact with one edge of the aperture 21 is displaced so that the catch 17 of the brake lever 11 is withdrawn from the toothed disc thus releasing the latter. The return movement of lever 6 when the roller 7 comes out of engagement with the notch 5a, is without influence on the brake lever 11, since the element 10, does not come in contact with the pins 15 and 16 of the brake lever 11, but takes the position as indicated by Fig. 5. The catch 17 of the film meter remains released and the latter can be actuated in known manner by the mechanism for moving the film by means of a frictional coupling, so that the meter indicates the length of the exposed film beginning at the notch 5a. At the end of the sensitized film band there is another notch 5b (Fig. 5) by which the lever 6 is caused to make the same reciprocating movement as in the case of the notch 5a. This operation which causes the meter to be stopped is effected in the following manner: When the roller 7 glides into the notch 5b, the element 10 is displaced and causes the brake lever 11 to be moved by the pin 16 engaging one edge of the aperture 21. In this manner the catch 17 of the brake lever 11 engages again the toothed disc 12, thus stopping the meter. When the roller 7 leaves the notch 5b, the element 10 is moved as in the case of the notch 5a without the brake lever 11 being moved thereby. Thus the meter 13 is stopped during the passage of the protective paper strip attached to the end of the film band which likewise is not registered on the meter.

What we claim is:—

1. In a moving picture apparatus the combination with a film meter, and means for locking said film meter, a lever for actuating said locking means, a delivery and a film receiving spool, a film placed on said spools, said film being provided with means adapted to engage said lever for controlling said locking means.

2. In a moving picture apparatus the combination with a film meter, and means for locking said film meter, a lever for actuating said locking means, a delivery and a film receiving spool, a film placed on said spools, said film being provided at a substantial distance from both its ends with incisions adapted to engage said lever for controlling said locking means.

3. In a moving picture apparatus the combination with a film meter, and a brake lever for locking said film meter, a controlling member adapted to bring said brake lever in and out of engagement with said film meter, a lever for actuating said controlling member, a delivery and a film receiving spool, a film placed on said spools, said film being provided at a substantial distance from both its ends with incisions adapted to engage said lever for actuating said controlling member.

4. In a moving picture apparatus the combination with a film meter, and a brake lever for locking said film meter, said brake lever being provided with a stop and three pins arranged at a substantial distance from each other, a controlling member provided with two apertures connected by a slot, said controlling member lying on said brake lever and engaging with its apertures and its slot the three pins of said brake lever, a lever rotatable round a pivot and having one end bent in an angular manner, a roller provided at the other end of said lever, a delivery and a film receiving spool, a film placed on said spools, said film being provided at a substantial distance from both its ends with incisions, a spring pressing said roller fixed to said lever against the film, and a spring pressing said controlling member against the bent end of said lever but exerting a lower pressure than the spring pressing said roller against said film.

LEO GOLDHAMMER.
WILHELM BAUMGÄRTNER.